United States Patent [19]

Pelzer

[11] 3,970,333
[45] July 20, 1976

[54] EXTENSION COMPENSATION AND EXPLOSION PROTECTION DEVICE

[75] Inventor: Franz Pelzer, Kirchheim, Germany

[73] Assignee: Dravo Corporation, Pittsburgh, Pa.

[22] Filed: Oct. 10, 1975

[21] Appl. No.: 621,461

[30] Foreign Application Priority Data
Oct. 16, 1974 Germany............................ 2449159

[52] U.S. Cl................................ 285/9 R; 285/94; 285/224; 285/302
[51] Int. Cl.² ...................................... F16L 55/00
[58] Field of Search.............. 285/9 R, 94, 302, 158, 285/224, 9 M, 165, 169, 177

[56] References Cited
UNITED STATES PATENTS

| | | | |
|---|---|---|---|
| 1,015,904 | 1/1912 | Niederlander et al................ | 285/94 |
| 2,460,746 | 2/1949 | Guthrie et al..................... | 285/94 X |
| 2,517,470 | 8/1950 | Erisman............................. | 285/9 R |
| 2,656,201 | 10/1953 | Swerdlow et al. ............... | 285/224 X |
| 2,828,980 | 4/1958 | Craig et al. ...................... | 285/302 X |
| 3,091,265 | 5/1963 | Ulstad............................. | 285/9 R X |
| 3,837,689 | 9/1974 | Csatlos................................ | 285/302 |

*Primary Examiner*—Thomas F. Callaghan
*Attorney, Agent, or Firm*—Parmelee, Miller, Welsh & Kratz

[57] ABSTRACT

An extension compensation member and explosion protection device for pipelines for gaseous media, such as waste gas pipes of sintering machines or other metallurgical aggregate apparatus. The invention allows for movement in both radial and axial directions of two pipe pieces interlocking vertically and concentrically. A ring-shaped seal is arranged at the outer periphery of the outer pipe piece allowing movement to compensate for thermal expansion but sealing the pipe joint so as to provide explosion protection.

4 Claims, 2 Drawing Figures

EXTENSION COMPENSATION AND EXPLOSION PROTECTION DEVICE

BACKGROUND OF THE INVENTION

1. Field of the Invention

The present invention relates generally to devices for sealing connections between two pipes or conduits while allowing for thermal expansion of one or both of the pipes, and more specifically relates to devices for sealing connections between waste gas pipes of sinter machines or similar apparatus with a gas collecting main.

2. Prior Art

Pipelines, particularly hot gas pipelines, such as waste gas pipes of sintering machine or other metallurgical aggregate apparatus, change their length during operation due to thermal expansion. In addition, they often are subject to vibration. In order to compensate for these thermal expansions and to avoid the occurrence of unacceptably high tensions or permanent deformations, extension compensation members have to be inserted. These extension compensation members have to allow for movements of the pipelines in radial as well as in axial directions. Furthermore, an explosion protection device is required in some cases.

Extension compensation members made of soft materials are susceptible to mechanical and chemical attacks, and with dust carrying gases there is a danger of hardening of such materials. Extension compensation members of flexible metallic material require high construction length, and higher restoring forces occur. With dust carrying gases, there is also the danger of clogging.

One extension compensation member is shown in German Auslegeschrift 1,180,705. This device consists of two pipe sockets attached concentrically to the pipe ends which interlock with radial intervals, one of which carries a disc-shaped clamping surface fixed to its end against which a seal ring, attached to the other pipe socket, is pressed with adjustable spring pressure. The clamping device is supported on the other pipe socket whereby the clamping surface is provided at the connection end of the inner pipe socket. The seal ring and its clamping device are provided at the free end of the pipe socket and the seal ring is arranged so that it can be adjusted. With this device, one slight axial displacement can be compensated since the axially acceptable play which equals the height of protection of the seal over its cylindrical guide surface is limited by the material related low dimensional stability of the seal material. This device is also not suitable as an explosion protection device.

SUMMARY OF THE INVENTION

The present invention is an extension compensation and explosion protection device for pipelines for gaseous media, including upper and lower concentric conduit members disposed on a common vertical axis with the upper conduit member having a diameter less than the diameter of the lower conduit member. A support ring is attached to the outside of the lower conduit member, and a first flexible ring-shaped seal is supported by the support ring. An annular plate is supported by the first flexible seal and surrounds the lower end of the upper conduit member. This annular plate has an inside diameter greater than the outside diameter of the upper conduit member, and an outside diameter greater than the outside diameter of the first flexible seal. A circular restraining member is attached to the upper surface of the annular plate and a second flexible ring-shaped seal is disposed between and contacts both the upper conduit member and the circular restraining member. A load ring is supported by the second flexible seal and urges the second flexible seal into sealing contact with both the upper conduit member and the circular restraining member. The circular restraining member preferably includes a tapered portion with the lower end of the circular restraining member being of smaller diameter than the upper end. Self-lubricating members may be disposed between the annular plate and the upper end of the lower conduit member.

The present invention is intended to avoid the shortcomings of the known compensation members, and particularly to create a device with the low construction height, simple construction, very low restoring forces and insensibility to mechanical damages, accumulation of dust and chemical attacks and also to serve as an explosion protection device. These objectives are attained in such a way that the support of the ring-shaped seal is attached inflexibly to the outer pipe piece such that on the end of the outer pipe piece an annular plate with a larger outside diameter is arranged so as to be radially movable. The inner pipe piece is arranged so that it extends with a slight play into the opening of the annular plate and a circular restraining member is arranged on the annular plate at a distance to the inner pipe such that a flexible seal may be located between the circular restraining member and the inner pipe and urged into position by the load ring.

DESCRIPTION OF THE PREFERRED EMBODIMENT

Figure 1:
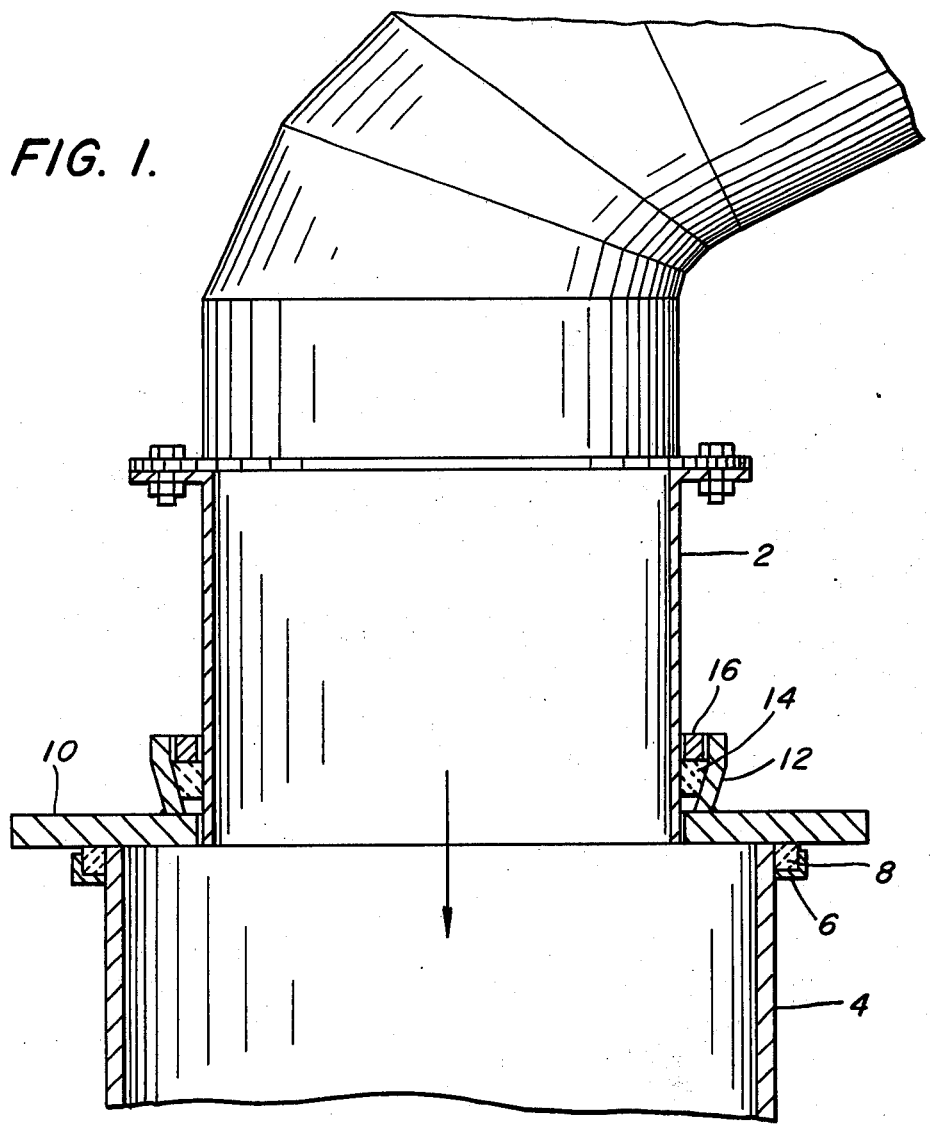
FIG. 1 is a side elevation view, partly in section, of a connection between a gas connecting line and a gas connecting main showing the seal of the present invention.

As shown in FIG. 1, an upper conduit member 2, such as a waste gas pipe of a sinter machine or similar apparatus, is concentrically placed above a lower conduit member 4, such as a gas collecting main. A support ring 6 is attached to the outside of the lower conduit member 4 and a first flexible ring-shaped seal 8 is supported by the support ring 6. An annular plate 10 is supported by the first flexible seal 8 and surrounds the lower end of the upper conduit member 2. The annular plate 10 has an inside diameter greater than the outside diameter of the upper conduit member 2 and an outside diameter greater than the outside diameter of the first flexible seal 8. The height of the first flexible seal 8 on the outer pipe piece 4 and the weight of the annular plate 10 can be selected in such a way that the annular plate 10 compresses the seal 8 to such an extent that the plate 10 is supported on the end of the outer pipe piece 4. In addition, the required but at the same time lowest possible support force on the plate 10 by the pipe piece 4 can be adjusted, taking into consideration the forces acting on the annular plate 10. The annular plate 10 is supported on the flexible seal 8 and the play between the opening of the annular plate 10 and the inner pipe piece 4 is preferably one to several millimeters.

A circular restraining member 12 is attached to the upper surface of the annular plate 10 and a second flexible ring-shaped seal 14 is disposed between and contacts both the upper conduit member 2 and the circular restraining member 12. Preferably, the circular restraining member 12 includes a tapered portion with the lower end of the circular restraining member 12 being of smaller diameter than the upper end.

A load ring is supported by the second flexible seal 14 and urges the second flexible seal 14 into sealing contact with both the upper conduit member 2 and the circular restraining member 12. The load ring 16 on the second flexible seal 14 may either press the seal 14 to the upper conduit member 2 by means of its own weight or by the addition of a spring force.

The first flexible seal 8 and the second flexible seal 14 may be made of material such as asbestos or the material known by the tradename "CERAFELT".

From the above, the operation of the seal of the present invention can be seen. The upper conduit member 2 will, upon being heated, expand both longitudinally, i.e., in the direction of the gas flow, and also radially away from the connection to the sintering machine. With an extension of the pipelines radially to the pipe ends, the annular plate 10 is shifted on the lower conduit member 4. With an expansion longitudinally to the pipe pieces, the upper conduit member 2 is lifted and lowered vertically as it cools or heats. In case of an explosion, the annular plate 10 will be lifted upwards to relieve the pressure.

Figure 2:
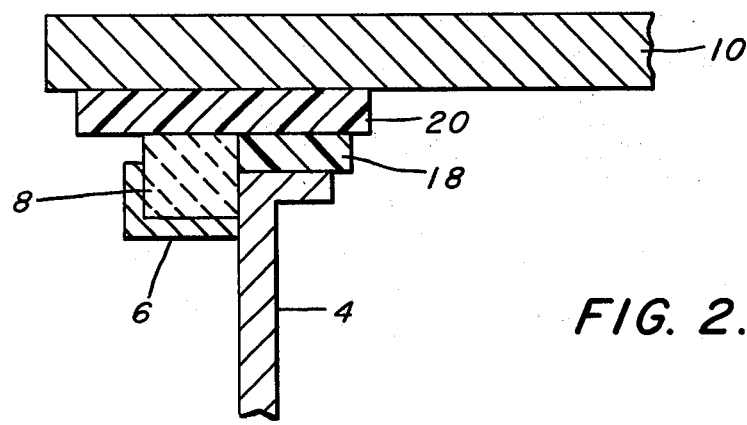
FIG. 2 is a sectional view of an alternative embodiment of the seal of the present invention.

In a preferred modification, as shown in FIG. 2, a self-lubricating support 18 is disposed between the annular plate 10 and the upper end of the lower conduit member 4. This allows for greater ease of movement, radial to the pipe pieces as the lines expand from heat. In addition, if desired, a self-lubricating backing 20 may be attached to the lower side of the annular plate 10 such that it rests on the first flexible member 8 and on the self-lubricating support 18 to provide additional ease of movement of the annular plate 10 when expansion occurs.

There has been described a seal for a connection between two conduit members which is of very simple construction, has a low construction height, can be assembled easily, has very low restoring forces, is insensitive to mechanical and chemical stress as well as dust content of the gas, and simultaneously can serve as an explosion protection device.

I claim:

1. Extension compensation and explosion protection device for pipelines for gaseous media, comprising:
    upper and lower concentric conduit members, disposed on a common vertical axis, with the upper conduit member having a diameter less than the diameter of the lower conduit member;
    a support ring attached to the outside of the lower conduit member;
    a first flexible, ring-shaped seal supported by the support ring;
    an annular plate supported by the first flexible seal and surrounding the lower end of the upper conduit member, having an inside diameter greater than the outside diameter of the upper conduit member, and an outside diameter greater than the outside diameter of the first flexible seal;
    a circular restraining member attached to the upper surface of the annular plate;
    a second flexible, ring-shaped seal disposed between and contacting both the upper conduit member and the circular restraining member; and
    a load ring, supported by the second flexible seal, and urging the second flexible seal into sealing contact with both the upper conduit member and the circular restraining member.

2. Extension compensation and explosion protection device for pipelines for gaseous media as claimed in claim 1 wherein the circular restraining member includes a tapered portion, with the lower end of the circular restraining member being of smaller diameter than the upper end.

3. Extension compensation and explosion protection device for pipelines for gaseous media as claimed in claim 1, including a self-lubricating support disposed between the annular plate and the upper end of the lower conduit member.

4. Extension compensation and explosion protection device for pipelines for gaseous media as claimed in claim 3, including a self-lubricating backing attached to the lower side of the annular plate, and resting on the first flexible member and the self-lubricating support.

* * * * *